(12) United States Patent
Moriguchi et al.

(10) Patent No.: US 7,811,398 B2
(45) Date of Patent: Oct. 12, 2010

(54) METHOD AND APPARATUS FOR INSPECTING PNEUMATIC TIRE DURING PRODUCTION

(75) Inventors: Kinya Moriguchi, Osaka (JP); Hajime Watanabe, Osaka (JP); Osamu Yamashita, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1111 days.

(21) Appl. No.: 11/494,668

(22) Filed: Jul. 27, 2006

(65) Prior Publication Data
US 2007/0023122 A1 Feb. 1, 2007

(30) Foreign Application Priority Data
Jul. 28, 2005 (JP) ............................. 2005-219605

(51) Int. Cl.
*B29D 30/32* (2006.01)
(52) U.S. Cl. ............................. 156/64; 73/146; 156/131; 156/135
(58) Field of Classification Search .................. 156/64, 156/123, 131, 133, 135; 73/146
See application file for complete search history.

(56) References Cited

U.S. PATENT DOCUMENTS

| 4,783,992 A * | 11/1988 | Ishibashi ..................... 73/146 |
| 2004/0045177 A1* | 3/2004 | Kobayashi ............... 33/203.15 |

FOREIGN PATENT DOCUMENTS

| EP | 1449638 A1 * | 8/2004 |
| JP | 2002-052620 A * | 2/2002 |
| JP | 2004-101433 | 4/2004 |
| JP | 2004-354258 | 12/2004 |
| JP | 2004-354259 | 12/2004 |
| KR | 2004110430 A * | 12/2004 |

OTHER PUBLICATIONS

Machine translation and Derwent abstract for JP 2004-101433-A, document published Apr. 2, 2004.*
Machine translation of JP 2002-052620A, patent publication published Feb. 19, 2002.*
Machine translation of KR 2004-0110430A, patent publication published Dec. 31, 2004.*
Derwent abstract for JP 2004-101433A, patent publication published Apr. 2, 2004.*

* cited by examiner

*Primary Examiner*—Geoffrey L Knable
(74) *Attorney, Agent, or Firm*—Jordan and Hamburh LLP

(57) ABSTRACT

An inspection method for inspecting beads provided on a tire building drum in process of production a pneumatic tire includes measuring a displacement amount in a radial direction on each of the beads lying axially on both sides of the drum with a distance sensor such as an eddy current sensor while rotating the drum, synthesizing displacement amounts so obtained on the beads on both the sides, calculating a harmonic of the displacement amounts in the radial direction of the beads by performing harmonic analysis on a resultant synthesized displacement amount, and determining whether the magnitude of the harmonic so calculated falls within a predetermined range.

6 Claims, 6 Drawing Sheets

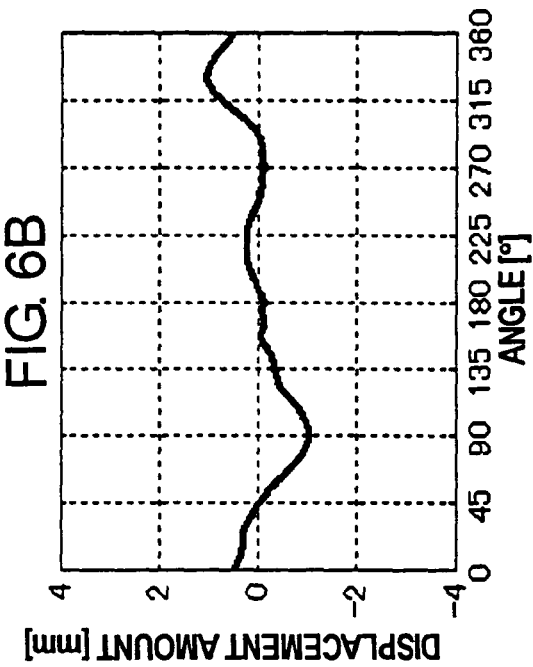
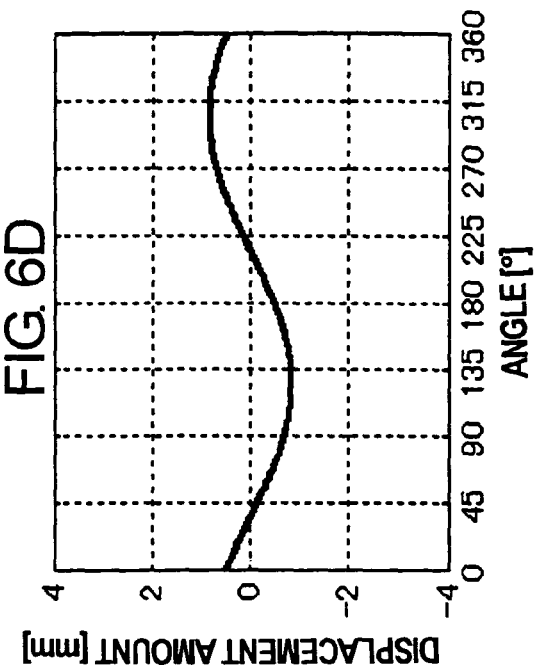
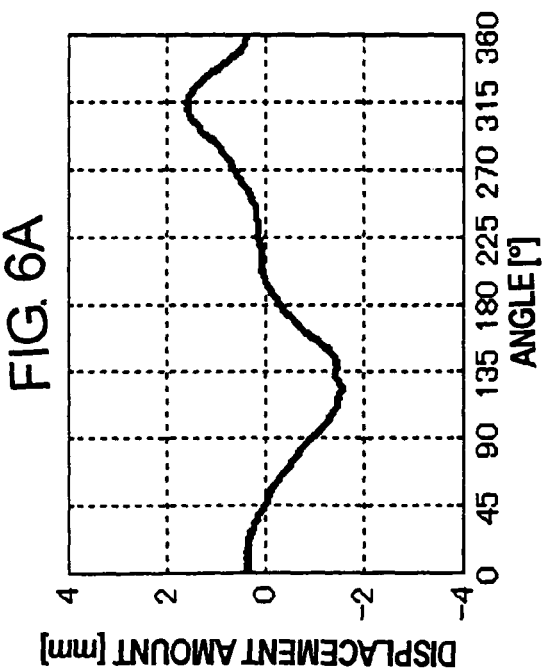
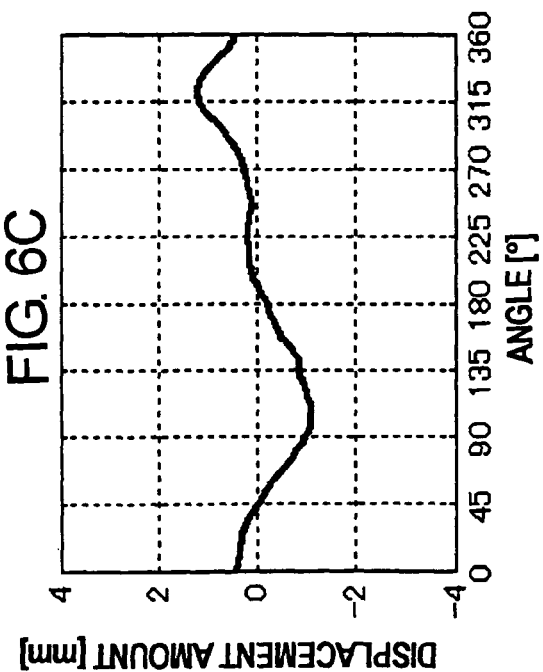

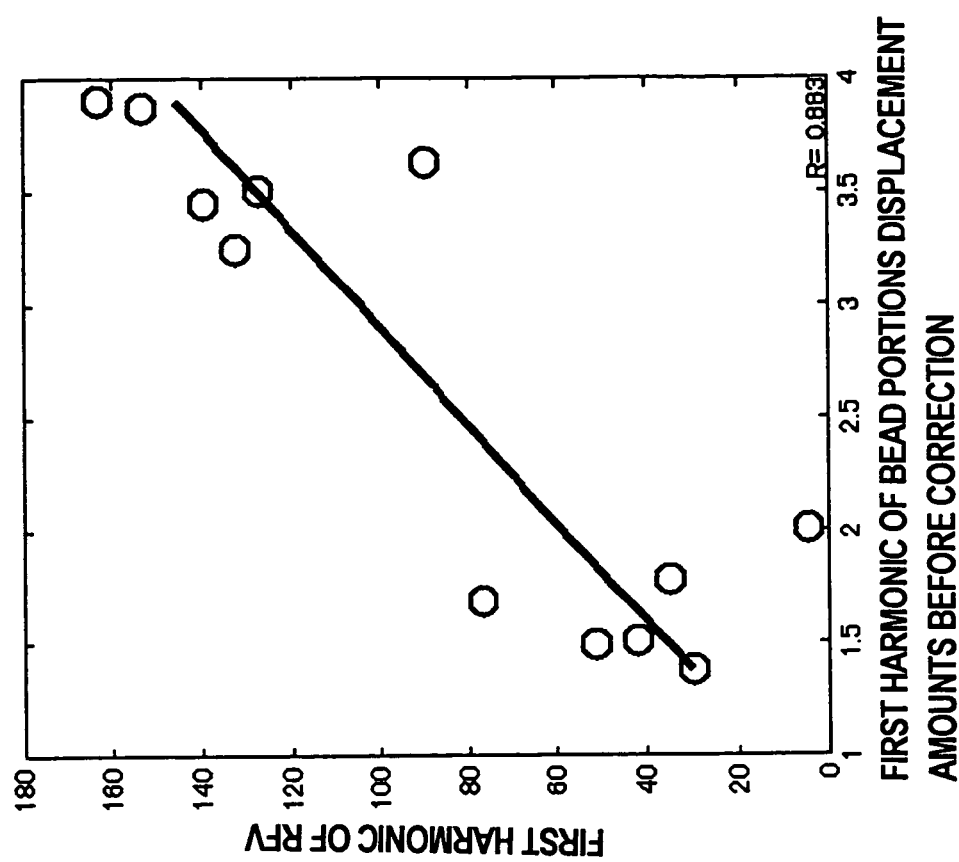
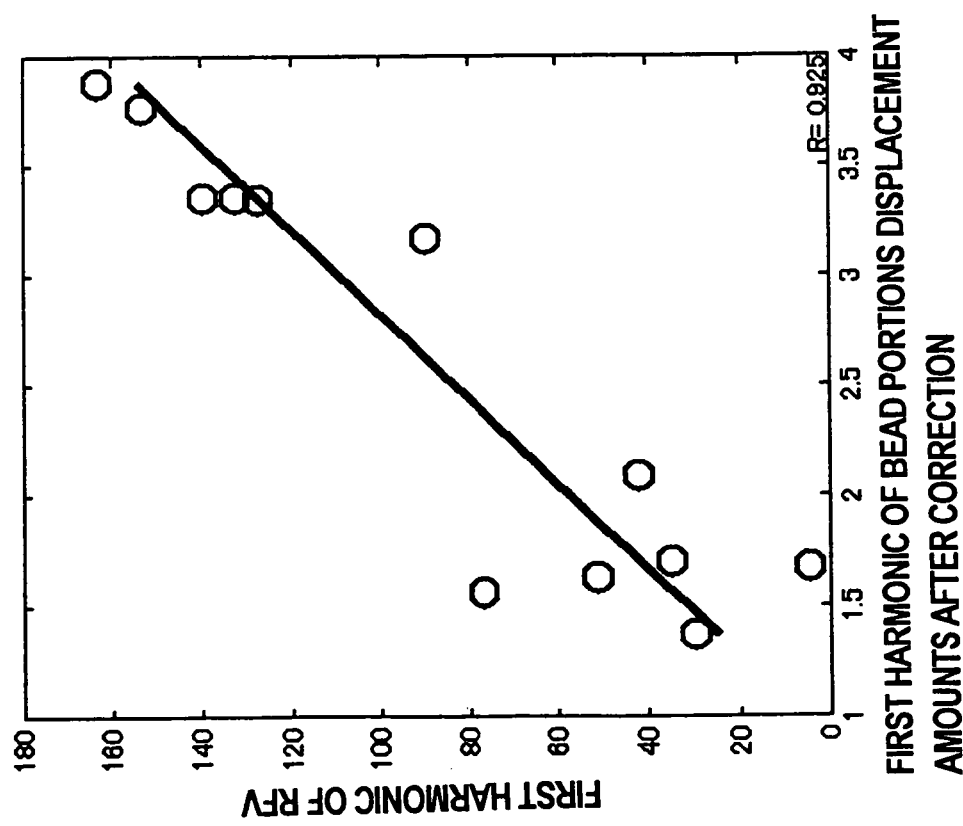

METHOD AND APPARATUS FOR INSPECTING PNEUMATIC TIRE DURING PRODUCTION

CROSS-REFERENCE TO RELATED APPLICATIONS

This application is based upon and claims the benefit of priority from the prior Japanese Patent Application No. 2005-219605, filed on Jul. 28, 2005; the entire contents of which are incorporated herein by reference.

BACKGROUND OF THE INVENTION

1. Field of the Invention

The present invention relates to a method and apparatus for inspecting a pneumatic tire with respect to the eccentricity of beads thereof during production. The invention also relates to a method for producing a pneumatic tire by making use of the inspection method.

2. Description of the Related Art

Low uniformity of pneumatic tires causes vibrations in a vehicle. Due to this, force variations occurring when they rotate are measured on pneumatic tires after production, and tires showing large force variations are disposed as defectives.

The variability of constituent members of tires being produced that occurs in steps of the tire production process is considered to constitute one of the causes which deteriorate the uniformity of completed tires. As one example of the variability, there is raised a deviation in center between bead wires and a tire body which occurs during bead setting, and in case a deviation like this occurs, the uniformity of a completed tire is largely affected.

Conventionally, however, there has existed no process control system which controls the production process from the viewpoint of the uniformity and hence, it is not until the uniformity of a completed tire is measured that a defect associated with low uniformity is found. Investigations for suspected causes of the defect are then carried out in the individual production steps to find eventually that the mechanical accuracy associated with the bead setting caused the defect. This cause locating process is the case that often happens with the deteriorated uniformity-related defect.

Due to this way of dealing with the defect, there have been caused problems that all tires that had passed through the relevant bead setting step until the defect was found are now defective, making lots of defectives to be discarded and that the production, which had been stopped when the defect was found, cannot not be resumed until the cause is verified.

Incidentally, the Japanese Unexamined Patent Publication (Kokai) No. 2004-354258 describes a method for inspecting joint portions on a belt ply made by joining circumferentially short strip-like sheet members together where end portions thereof are joined to each other by wrapping the belt ply around a tire building drum and measuring a radial run-out of the belt ply in the circumferential direction with a one-dimension laser sensor while rotating the tire building drum in that state. In addition, the Japanese Unexamined Patent Publication (Kokai) No. 2004-354259 discloses a method for inspecting a tread rubber formed on a tire building drum with respect to a contour configuration using a laser sensor. While these Japanese Unexamined Patent Publications are such as to disclose the inspection methods for inspecting pneumatic tires under production, the inventions disclosed therein are not such as to be made to inspect on the eccentric amount of the beads.

Additionally, the Japanese Unexamined Patent Publication (Kokai) No. 2004-101433 discloses a method for measuring a radial run-out (RRO) of a breaker with high accuracy and good efficiency using an eddy current displacement sensor, but the method is intended to inspect completed tires as products and is not intended to measure the eccentric amount of the beads, either.

SUMMARY OF THE INVENTION

The invention was made in the light of the views pointed out above and an object thereof is to provide a method and apparatus which can reduce largely the amount of defects that are generated in association with low uniformity and can also reduce time until the production is resumed by measuring and controlling the eccentric amount of beads after they have been set in place.

The inspection method according to the invention is a method for inspecting beads provided on a tire building drum in process of production a pneumatic tire in which a displacement amount in a radial direction is measured on each of the beads lying axially on both sides of the drum with a non-contact distance sensor while rotating the drum. Then, displacement amounts so obtained on the beads on both the sides of the drum are synthesized, and a harmonic of the displacement amounts in the radial direction of the beads is calculated by performing harmonic analysis on a resultant synthesized displacement amount. When carrying out the calculation, normally, the displacement amounts obtained as described above are averaged out over the beads on both the sides of the drum, and a harmonic analysis is performed on a resultant averaged-out displacement amount. Then, whether or not the magnitude of the harmonic so calculated falls within a predetermined range is determined.

In addition, the inspection apparatus according to the invention is an apparatus for inspecting beads provided on a tire building drum in process of production a pneumatic tire which includes non-contact distance sensors for detecting displacement amounts in a radial direction of the beads lying axially on both sides of the drum, a data obtaining unit for obtaining data related to the displacement amounts in the radial direction of the beads for a single rotation of the drum from the distance sensors, a data processing unit for synthesizing the displacement amounts of the beads lying on both the sides of the drum using the data obtained and calculating a harmonic of the displacement amounts in the radial direction of the beads by performing harmonic analysis on a resultant synthesized displacement amount, and a determination unit for determining whether or not the magnitude of the harmonic of the displacement amounts falls within a predetermined range.

In an embodiment of the invention, the distance sensors are made up of eddy current sensors, and displacement amounts in a radial direction of bead wires may be measured by measuring distances from the sensors to the bead wires, respectively. Namely, while laser sensors can be used as the distance sensors, in the event of laser sensors, when the bead wires are covered with rubber such as a carcass ply or a rim strip, a distance as far as the surface of the rubber is to be measured, and hence, it is hard to measure accurately an eccentric amount of the bead wire. In contrast to this, in the event that eddy current sensors are used, even in a case where the bead wires are covered with rubber, since distances to the metallic bead wires can be measured, eccentric amounts of the bead wires which affect the uniformity of a tire to be produced can be measured accurately. In the event that the carcass ply contains metallic cords, however, since it is hard to measure the distance to the bead wire even with the eddy current sensor, the eddy current sensors become effective in a case where the carcass ply is made of only non-conductive cords.

Thus, with the eddy current sensors used, in the event that the bead wires deviate in the axial direction of the drum, measured values become different from actual radial displacement amounts. Due to this, in the embodiment of the invention, deviation amounts of the bead wires in the axial direction of the drum are measured using non-contact distance sensors, and the measured values by the eddy current sensors may be corrected based on the deviation amounts so measured so as to obtain the displacement amounts in the radial direction of the bead wires, whereby the eccentric amounts of the bead wires can be measured with better accuracy.

In addition, the invention provides a pneumatic tire production method comprising forming a carcass ply on a tire building drum, setting beads on the carcass ply, measuring a displacement amount in a radial direction of each of the beads lying axially on both sides of the drum with a non-contact distance sensor while rotating the drum, synthesizing displacement amounts of the beads on both sides of the drum so obtained, calculating a harmonic of the displacement amounts in the radial direction of the beads by performing harmonic analysis on a resultant synthesized displacement amount, determining whether or not the magnitude of the harmonic so calculated falls within a predetermined range, preparing a green tire using the beads for which the magnitude of the harmonic is determined to fall within the predetermined range, and vulcanizing to mold the green tire.

According to the invention, since the beads are inspected on the eccentric amounts thereof, which affect largely the uniformity of a completed tire, after they have been provided on the tire building drum, a defect can be detected in the midst of production. Due to this, the generation of defects is largely reduced in amount, thereby making it possible to reduce material costs. In addition, a failed location in the mechanical facility can be verified early, so as to enable the failure to be dealt with in a smooth fashion, thereby making it possible to reduce time during which the relevant mechanical part of the facility is out of operation.

BRIEF DESCRIPTION OF THE DRAWINGS

FIGS. 6A to 6D are graphs which show displacement amounts in a radial direction of bead wires, in which FIG. 6A shows data on a serial side, FIG. 6B data on an opposite serial side, FIG. 6C an average waveform resulting from averaging out both the data, and FIG. 6D a waveform of a first harmonic of the average waveform.

FIGS. 7A and 7B are graphs which show relationships between the magnitude of a first harmonic of a displacement amount of bead portions in a tire as an intermediate product and the magnitude of a first harmonic of RFV of the tire which is completed as a final product, in which FIG. 7A shows a relationship with correction and FIG. 7B a relationship without correction.

DETAILED DESCRIPTION OF THE INVENTION

Hereinafter, an embodiment of the invention will be described by reference to the accompanying drawings.

Figure 1:
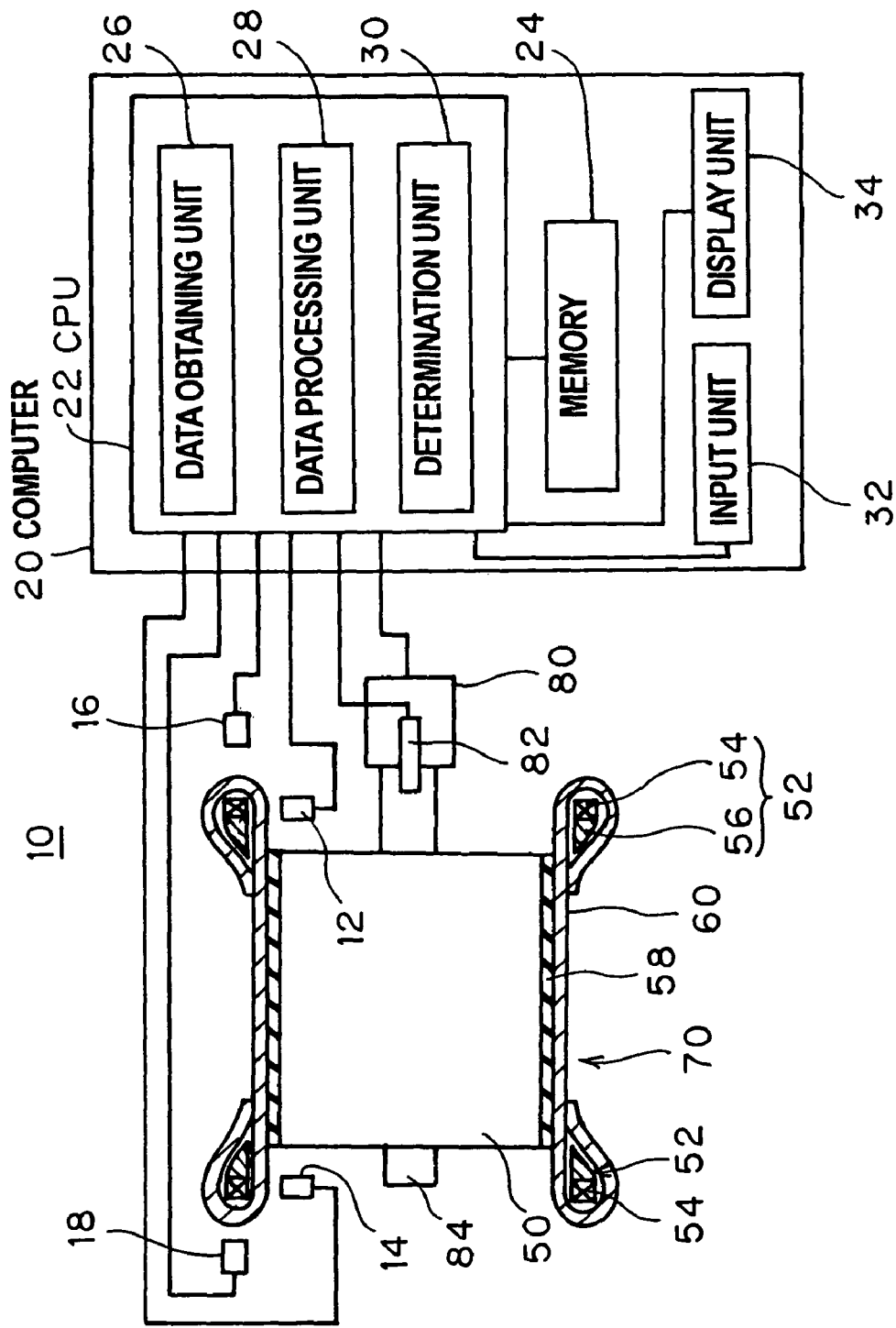
FIG. 1 is an exemplary diagram which shows the configuration of an inspection apparatus according to an embodiment of the invention.

FIG. 1 is an exemplary diagram which shows the configuration of an inspection apparatus 10 according to the embodiment. This inspection apparatus 10 includes a pair of left and right, first and second distance sensors 12, 14 for detecting displacement amounts of beads 52, which are set on a tire building drum 50, in a radial direction thereof, a pair of left and right, third and fourth distance sensors 16, 18 for detecting displacement amounts of the beads 52 in an axial direction of the drum, and a computer 20.

An inner liner 58 is wound around the tire building drum 50, and a carcass play 60 is then wound around the inner liner 58, whereafter the beads 52 are set on both axial sides of the drum 50. Furthermore, the carcass ply 60 is folded back (or turned up) axially inwards at both edge portions in such a manner as to encompass therein the beads 52, respectively, whereby an intermediate product 70 is formed which is in a middle step of a production process of a tire, and in this embodiment, this intermediate product is to be a target for inspection. The beads 52 are each made up of a bead wire 54 which is made of a bundle of metallic wires formed into a ring shape and a rubber bead filler 56 which is disposed on an radially outer circumference of the bead wire 54.

In addition, while there is imposed no limitation on the intermediate product which constitutes a target for inspection, provided that the beads 52 have already been set on but no vulcanization has yet been carried out on the intermediate product, in order to find a defect in as early a step as possible, an intermediate product resulting immediately after the carcass ply 60 has been turned up or one resulting immediately after a rim strip 62 and/or a side wall 64 (refer to FIG. 4) have been wound around the turned up carcass ply 60 are preferred as the intermediate product for inspection.

The tire building drum 50 includes a motor 80 functioning as a rotational driving device, so as to be rotated by the motor 80. In addition, a rotational position sensor 82 such as an rotational pulse encoder is provided on the tire building drum 50 which functions as a rotation detecting device for detecting a rotational position of the tire building drum 50. Angle information such as gears is provided circumferentially on a rotational shaft 84 of the drum 50 at equal intervals, and data sampling, which will be described later on, is preferably carried out at the intervals at which the angle information is provided while detecting the angle information by the rotational position sensor 82. By carrying out the data sampling while obtaining position information for each rotation of the rotational shaft 84 using the rotational position sensor 82, the intended sampling can be carried out even though the drum 50 rotates irregularly, thereby making it possible to obviate the necessity of waiting until the drum 50 comes to rotate at constant speed.

Figure 2:
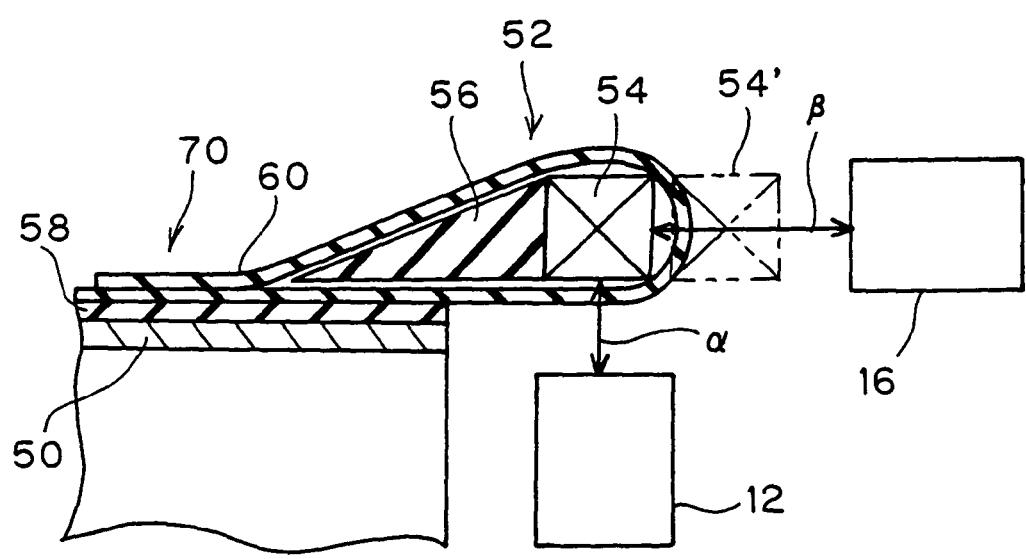
FIG. 2 is an enlarged sectional view of a main part of FIG. 1.

The first and second distance sensors 12, 14 are non-contact displacement sensors and eddy current sensors are used in this embodiment. The eddy current sensors are displacement sensors for measuring distances between the sensors and measurement targets by generating eddy current in measurement targets (the metallic bead wires 54) by alternate current magnetic fields from the sensors and detecting voltages generated by the eddy current so generated. As shown in FIGS. 1, 2, the distance sensors 12, 14 are provided at positions which lie close to the axial end portions of the intermediate product 70 on an inner circumferential side thereof so as to radially face the bead wires 54, respectively, to detect displacement amounts in a radial direction of the bead wires 54 by measuring distances $\alpha$ to the bead wires 54. Note that the first distance sensor 12 is such as to measure a displacement amount of the bead wire 54 on a serial side of the intermediate product 70 whereas the second distance sensor 14 is such as to measure a displacement amount of the bead wire 54 on an opposite serial side.

The third and fourth distance sensors 16, 18 are non-contact displacement sensors. In the first and second distance sensors 12, 14, when the bead wires 54 deviate in the axial direction of the drum (for example, a state indicated by chain double-dashed lines 54' in FIG. 2), detected voltages become different. Then, in this embodiment, the third and fourth distance sensors 16, 18 are provided which can detect deviation amounts of the bead wires 54 in the axial direction of the drum (that is, in a lateral direction), so that measured values by the first and second distance sensors 12, 14 are corrected based on deviation amounts measured by the third and fourth sensors 16, 18. As shown in FIGS. 1, 2, the sensors 16, 18 are provided at positions which lie axially outwards of axial ends of the intermediate product 70 so as to axially face the bead wires 54, respectively, to detect deviation amounts of the bead wires 54 in the axial direction by measuring distances $\beta$ to the bead wires 54. While laser sensors can be used as these sensors 16, 18, eddy current sensors are used in this embodiment. Note that the third distance sensor 16 is such as to measure a deviation amount of the bead wire 54 on the serial side whereas the fourth distance sensor 18 is such as to measure a deviation amount of the bead wire 54 on the opposite serial side.

As the computer 20 that is connected to the first to fourth distance sensors 12, 14, 16 and 18, the motor 80 and the rotational position sensor 82, for example, a normal personal computer or process control microprocessor is used. A central processing unit (CPU) 22 of the computer 20 reads in a processing program from a memory 24 when the computer 20 is activated and functions as a data obtaining unit 26, a data processing unit 28 and a determination unit 30 and the like.

The data obtaining unit 26 receives displacement signals from the first and second sensors 12, 14 (signals representing distances from the sensors to the bead wires 54) and obtains data on displacement amounts in the radial direction of the bead wires 54 for a single rotation of the drum. For example, the data obtaining unit 26 samples displacement signals at a plurality of points which are arranged circumferentially at intervals of a predetermined angle (for example, 72 points circumferentially arranged at intervals of 5°) using the rotational position sensor 82 and obtains the displacement signals so sampled as data for the single rotation of the drum.

In addition, the data obtaining unit 26 receives displacement signals from the third and fourth distance sensors 16, 18 so as to also obtain data on deviation amounts in the axial direction of the bead wires 54 for the single rotation of the drum.

Figure 5:
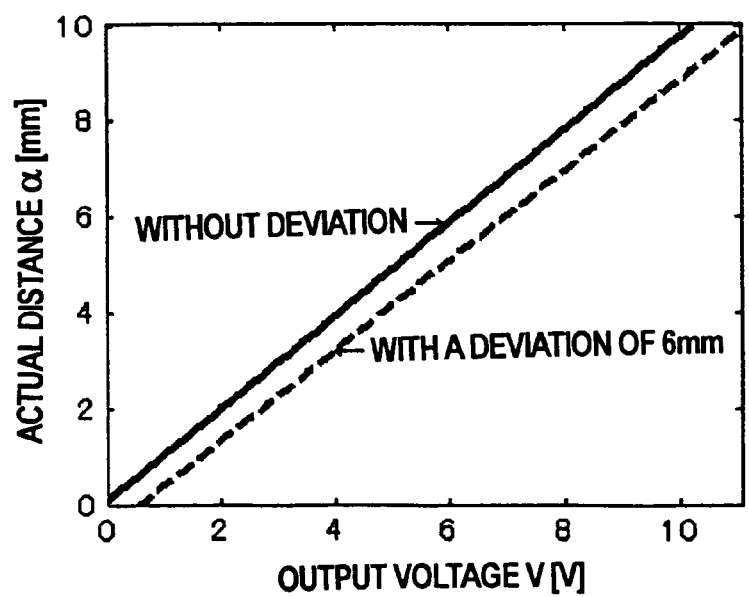
FIG. 5 is a graph which shows a relationship between an output voltage (V) of a distance sensor and a detection distance α.

Furthermore, the data obtaining unit 26 corrects values measured by the first and second distance sensors 12, 14 based on the deviation amounts. To be specific, the data obtaining unit 26 determines whether or not the deviation amounts fall within a predetermined range (for example, 1 mm), and since an axial deviation falling within the predetermined range can be ignored, in case the deviation amounts fall within the predetermined range, the data obtaining unit 26 does not carry out the correction. On the contrary, in case the deviation amounts exceed the predetermined range, the data obtaining unit 26 corrects the values measured by the first and second sensors 12, 14 using a correction formula which is obtained in advance. As an example of this, relationships between the output voltage (V) of the first and second sensors 12, 14 and the distance $\alpha$ are shown in FIG. 5 which result when there exists no axial deviation and when there exists an axial deviation of 6 mm, respectively. A relationship like this is obtained in advance for each deviation amount, and corrections are carried out based on the relationships so obtained.

Thus, in the way that has been described heretofore, the data obtaining unit 26 obtains data on displacement amounts in the radial direction of the bead wires 54 for the single rotation of the drum on both the sides, the serial and opposite-serial sides, of the intermediate product 70, respectively.

The data processing unit 28 performs an averaging processing over the serial side bead 52 and the opposite serial side bead 52 using the radial displacement amounts of the bead wires 54 obtained by the data obtaining unit 26 as described above. Namely, the data processing unit 28 synthesizes waveforms of both the serial side and opposite serial side bead wires 54 so as to calculate an intermediate value. Thus, the influence due to the inclination of the intermediate product 70 relative to the tire building drum 50 can be eliminated by composing to average out the data of the beads 52 on both the sides of the intermediate product 70 like this. Since the overall inclination of the intermediate product 70 like this does not affect the radial run-out (RRO) and RFV (radial force variation) of a completed tire as a final product, only the eccentric amounts of the beads 52 which affect the uniformity of the tire can be obtained by averaging out the displacement amounts thereof.

In addition, the data processing unit 28 performs a harmonic analysis such as Fourier analysis using the data on displacement amounts which are averaged out as has been described above, that is, the data on fluctuation in the radial displacement amounts of the bead wires 54 in the circumferential direction of the beads, so as to calculate, for example, a first harmonic.

The determination unit 30 determines whether or not the magnitude of the harmonic of the displacement amounts that is calculated by the data processing unit 28 as has been described above falls within a predetermined range (for example, 2.5 mm or smaller). Namely, a relationship between the harmonic and the uniformity (RFV, RRO) of a completed tire as a final product is obtained in advance, and the determination unit 30 determines whether acceptable or unacceptable based on the relationship.

The result of the determination is then displayed on a display unit 34. To be specific, in case the result of the determination is out of the range and hence is unacceptable, a monitor such as a display displays thereon an indication in this respect or an alarm is raised by a warning device.

Figure 3:
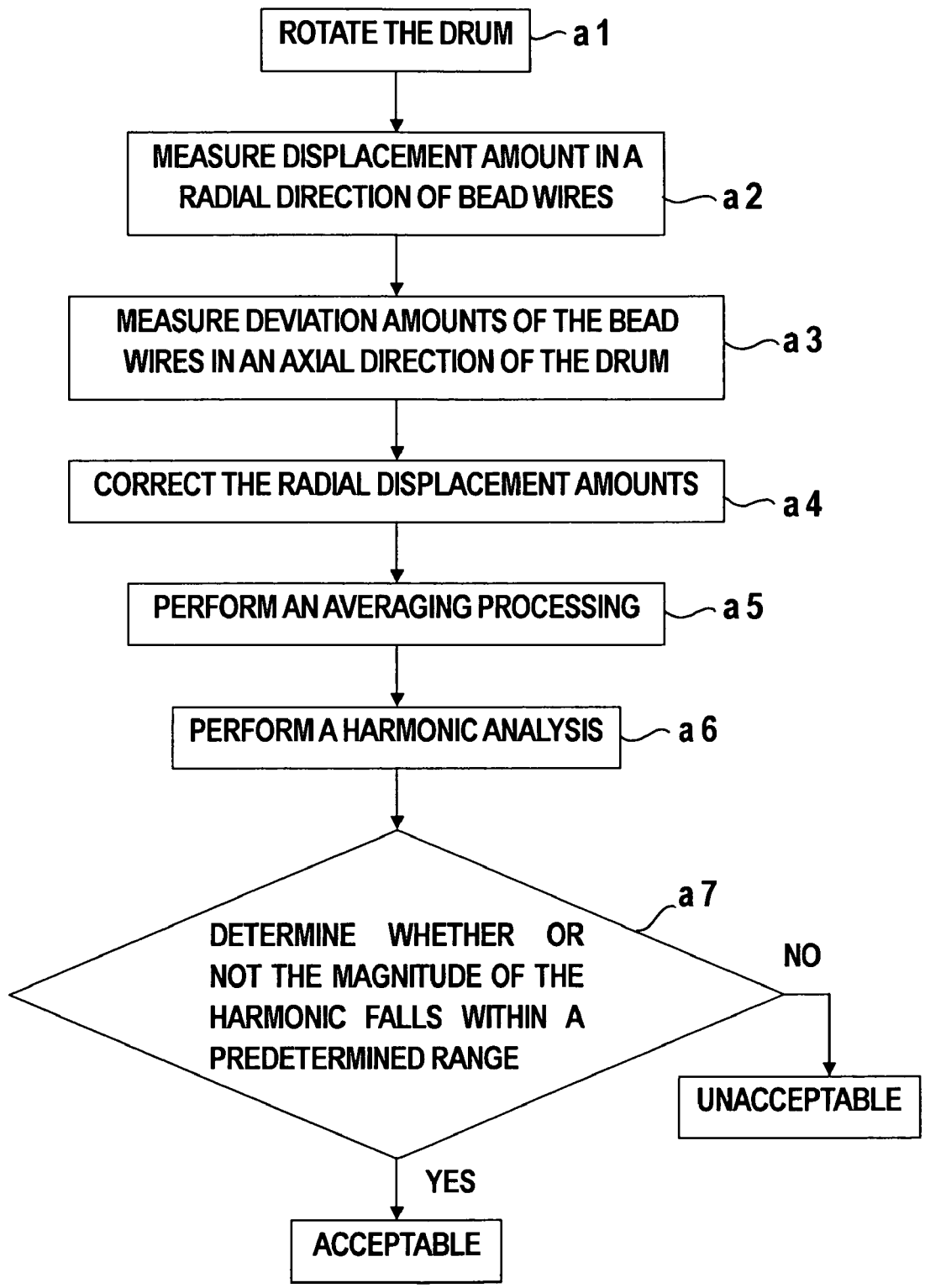
FIG. 3 is a flowchart which shows the flow of a process according to the embodiment.

Next, an example of the flow of the inspection process will be described further based on a flowchart shown in FIG. 3.

Firstly, in step a1, a signal is outputted to the motor 80 to rotate the tire building drum 50 on which the intermediate product 70 is provided.

Following this, in step a2, the data obtaining unit 26 obtains data on the beads 52 lying on both the sides of the drum 50 for a single rotation of the drum. Specifically speaking, the data obtaining unit 26 samples displacement signals from the first and second distance sensors 12, 14 every predetermined angle while detecting the angle information positions by the rotational position sensor 82 and then obtains the displacement signals so sampled as data for the single rotation of the drum. As this occurs, while data only for the single rotation may be obtained, data are preferably measured for a plurality of rotations so as to be averaged out.

In addition, in step a3, the data obtaining unit 26 samples displacement signals representing deviation amounts from the third and fourth distance sensors 16, 18 every predetermined angle while detecting the angle information positions by the rotational position sensor 82 and then obtains the displacement signals so sampled as data for the single rotation of the drum. This step 3a is normally performed at the same time as step a2.

Then, in step a4, the data on the radial displacement amounts obtained in step a2 are corrected based on the data on the deviation amounts obtained in step a3. To be specific, whether or not the data on the deviation amounts obtained in step a3 fall within a predetermined range that has been inputted in advance via an input unit 32 is determined, and if the data do not fall within the predetermined range, the data obtained in step a2 are corrected in accordance with the deviation amounts. On the contrary, if the data obtained in step a3 fall within the predetermined range, no correction is performed. Thus, the data on the radial displacement amounts of the bead wires 54 for the single rotation of the drum are obtained on both the sides, the serial and opposite-serial sides, of the intermediate product 70, respectively, in the way that has been described heretofore, and the data so obtained are then stored temporarily in the memory 24. Note that not only a keyboard but also a various types of disk drives such as a floppy disk, CD and DVD are enumerated as the input unit 32.

Next, in step a5, the displacement amounts of the bead wires 54 are averaged out over the serial side bead 52 and the opposite serial side bead 52 by the data processing unit 28 using the data on the displacement amounts in the radial direction of the bead wires 54 stored in the memory 24. For example, FIG. 6A shows data on the displacement amount on the serial side, and FIG. 6B shows data on the displacement amount on the opposite serial side, and by averaging out both the data, an average waveform shown in FIG. 6C is obtained.

Next, in step a6, harmonic analysis is performed on the average waveform obtained in the previous step to calculate a harmonic of the displacement amounts in the radial direction of the bead wires 54. As an example of this, a graph of a first harmonic obtained by performing harmonic analysis on the average waveform shown in FIG. 6C is shown in FIG. 6D.

Thereafter, in step a7, the determination unit 30 determines whether or not the magnitude of the harmonic falls within the predetermined range that has been inputted in advance via the input unit 32, and if the magnitude is determined to fall within the predetermined range, the result of the inspection is acceptable, and the inspection is completed there. On the contrary, the magnitude of the harmonic exceeds the predetermined range, the result is determined to be unacceptable, and an indication in this respect is displayed on the display unit 34.

Figure 4:
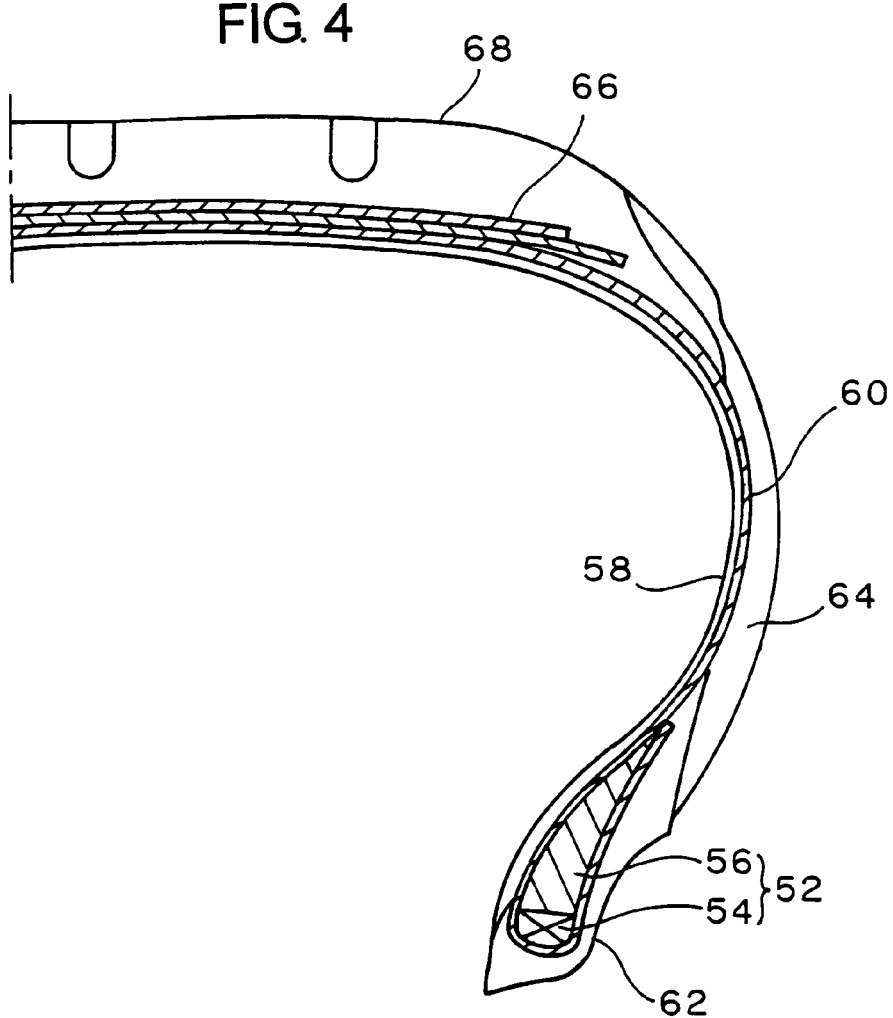
FIG. 4 is a sectional view of a pneumatic tire in a width direction of a tread thereof.

Then, only intermediate products 70 that have passed the inspection are allowed to proceed to a subsequent tire building step, that is, belts 66 and a tread 68 are wrapped around the intermediate product 70 that has passed the inspection to thereby prepare a green tire, which is then finally vulcanized and molded so as to obtain a pneumatic tire as a final product (refer to FIG. 4).

According to the embodiment that has been described heretofore, the eccentric amounts of the bead wires 54 after they have been set which largely affect the uniformity of a completed tire can be measured in the midst of production thereof. In particular, since the deviation amounts of the bead wires 54 in the axial direction of the drum are measured using the third and fourth distance sensors 16, 18 to thereby correct the values measured by the first and second distance sensors 12, 14 based on the deviation amounts, the eccentric amounts of the bead wires 54 can be measured with good accuracy.

As an example of this, according to the embodiment, a first harmonic is obtained for the displacement amounts in the radial direction of bead wires 54 in an intermediate product of a radial tire of LT235/85R16 120Q after the turning up of a carcass ply, and FIGS. 7A, 7B are graphs which show relationships between the magnitude of the first harmonic of the radial displacement amount of the bead wires 54 so obtained and the magnitude of a first harmonic of RFV of the tire completed as a final product. Here, the air pressure of the tire when an RFV was measured was 300 kPa, and a load imposed on the tire at the time of measuring the RFV was 7551N. FIG. 7A shows a relationship resulting when the correction described as occurring in step a4 using the third and fourth distance sensors 16, 18 was carried out, whereas FIG. 7B shows a relationship resulting when no such correction was carried out. As is clear from the graphs, a correlation coefficient resulting when the correction was carried out was R=0.925, which is higher than a correlation coefficient, R=0.883, which resulted when no correction was carried out, and it is understood from this that defects can be detected with better accuracy by carrying out the correction.

Thus, as has been described heretofore, according to the embodiment, since defects can be detected in process of production of tires, the defects so detected can be dealt with in the early step, and the amount of defects to be generated can be reduced largely, thereby making it possible to reduce costs for materials. In addition, a failed location in the mechanical facility can be identified early, so as to enable the failure to be dealt with in a smooth fashion, thereby making it possible to reduce time during which the relevant mechanical part of the facility is out of operation.

According to the invention, since the defect can be detected which is triggered by the eccentricity of the beads in the intermediate product in the midst of production and which affects largely the uniformity of a tire completed as a final product, the invention can be used to control the process of production when producing various types of pneumatic tires.

What is claimed is:

1. An inspection method, for inspecting beads provided on a tire building drum in process of production a pneumatic tire, comprising;

measuring a displacement amount in a radial direction on each of the beads lying axially on both sides of the Lire building drum with a non-contact distance sensor while rotating the tire building drum;

synthesizing displacement amounts so obtained on the heads on both the sides of the drum, calculating a harmonic of the displacement amounts in the radial direction of the beads by performing harmonic analysis cm resultant synthesized displacement amounts, and determining whether or not a magnitude of the harmonic so calculated falls within a predetermined range;

the distance sensor being an eddy current sensor, and the displacement amount in the radial direction of a head wire of each of the heads being measured by measuring a distance from the distance sensor to the head wire;

measuring a deviation amount of the head wire in an axial direction of the drum using another non-contact distance sensor; and correcting values measured by the eddy current sensor based on the deviation amount measured to obtain the displacement amount in the radial direction of the bead wire.

2. An inspection method as set forth in claim 1, wherein the another non-contact distance sensor which measures the deviation amount is an eddy current sensor.

3. An inspection method as set forth in claim 1 wherein;

a relationship between the magnitude of the harmonic of the displacement amount and the uniformity of a completed tire as a final product is obtained, so as to obtain a tolerance for the magnitude of the harmonic from the relationship so obtained; and the determining whether or not a magnitude of the harmonic so calculated falls within the predetermined range determines whether or not the magnitude of the calculated harmonic falls within the tolerance.

4. A pneumatic tire production method comprising:

forming a carcass ply on a tire building drum, setting beads thereon;

measuring a displacement amount in a radial direction of each of the beads lying axially on both, sides of the tire building drum with a non-contact distance sensor while rotating the tire building drum;

synthesizing displacement amounts of the heads on both sides or the tire building drum so obtained, calculating a harmonic or the displacement amounts in the radial direction of the beads by performing harmonic analysis on resultant synthesized displacement amounts, and determining whether or not the magnitude of the harmonic so calculated falls within a predetermined range;

preparing a green tire using the heads for which the magnitude of the harmonic is determined to fall within the predetermined range, and vulcanizing to mold the green tire;

the distance sensor being an eddy current sensor, and the displacement amount in the radial direction of a bead wire of each of the beads being measured by measuring a distance from the distance sensor to the bead wire;

measuring a deviation amount of the bead wire in an axial direction of the drum using another non-contact distance sensor; and correcting values measured by the eddy current sensor based on the deviation amount measured to obtain the displacement amount in the radial direction of the bead wire.

5. A pneumatic tire production method as set forth in claim 4, wherein the another non-contact distance sensor which measures the deviation amount is an eddy current sensor.

6. A pneumatic tire production method as set forth in claim 4 wherein;

a relationship between the magnitude of the harmonic of the displacement amount and the uniformity of a completed tire as a final product is obtained, so as to obtain a tolerance for the magnitude of the harmonic from the relationship so obtained; and the determining whether or not a magnitude of the harmonic so calculated falls within the predetermined range determines whether or not the magnitude of the calculated harmonic falls within the tolerance.

\* \* \* \* \*